Nov. 4, 1958 O. C. HALL 2,859,285

ALARM SENDING CIRCUIT

Filed June 1, 1954 3 Sheets-Sheet 1

INVENTOR
O. C. HALL

BY C. Mattie

ATTORNEY

ALARM SENDING CIRCUIT

Filed June 1, 1954 3 Sheets-Sheet 2

INVENTOR
O. C. HALL
BY C. Mattice
ATTORNEY

Nov. 4, 1958 O. C. HALL 2,859,285

ALARM SENDING CIRCUIT

Filed June 1, 1954 3 Sheets-Sheet 3

INVENTOR
O. C. HALL
BY C. Mattice
ATTORNEY

United States Patent Office 2,859,285

Patented Nov. 4, 1958

2,859,285

ALARM SENDING CIRCUIT

Oliver C. Hall, Fair Lawn, N. J., assignor to Bell Telephone Laboratories, Incorporated, New York, N. Y., a corporation of New York Application June 1, 1954, Serial No. 433,653

4 Claims. (Cl. 179—27)

This invention relates to telephone systems and more particularly to improved means for transmitting alarm signals from an unattended office to a master office.

The present invention is in the nature of an improvement on the alarm sending arrangement disclosed in Patent 2,262,595 granted to J. N. Walters on November 11, 1941. In this patent means is provided when an alarm condition arises at an unattended office to seize a trunk leading to the operator office and transmit thereover a signal indicating that an alarm condition exists. When the operator responds to the alarm call, the alarm sending equipment is locked under the control of the alarm circuit until the trouble causing it is corrected. The operator may then set up a trouble checking connection over which the nature of the trouble may be determined. This arrangement is satisfactory for minor troubles since they usually involve either a small number of subscribers or a small amount of equipmnet. It is reasonably satisfactory for major troubles if an immediate trouble check is made and the trouble is promptly cared for. However, it is quite humanly possible that the alarm may be misinterpreted, overlooked, or its correction unduly delayed.

In accordance with the present invention, means is provided which is effective in the case of a major alarm condition to periodically unlock the alarm sending equipment and retransmit an alarm signal to the operator office until the trouble has been corrected.

The features of the invention will be more clearly understood from a consideration of the following description read in connection with the attached drawing in which.

Figures 1, 4:
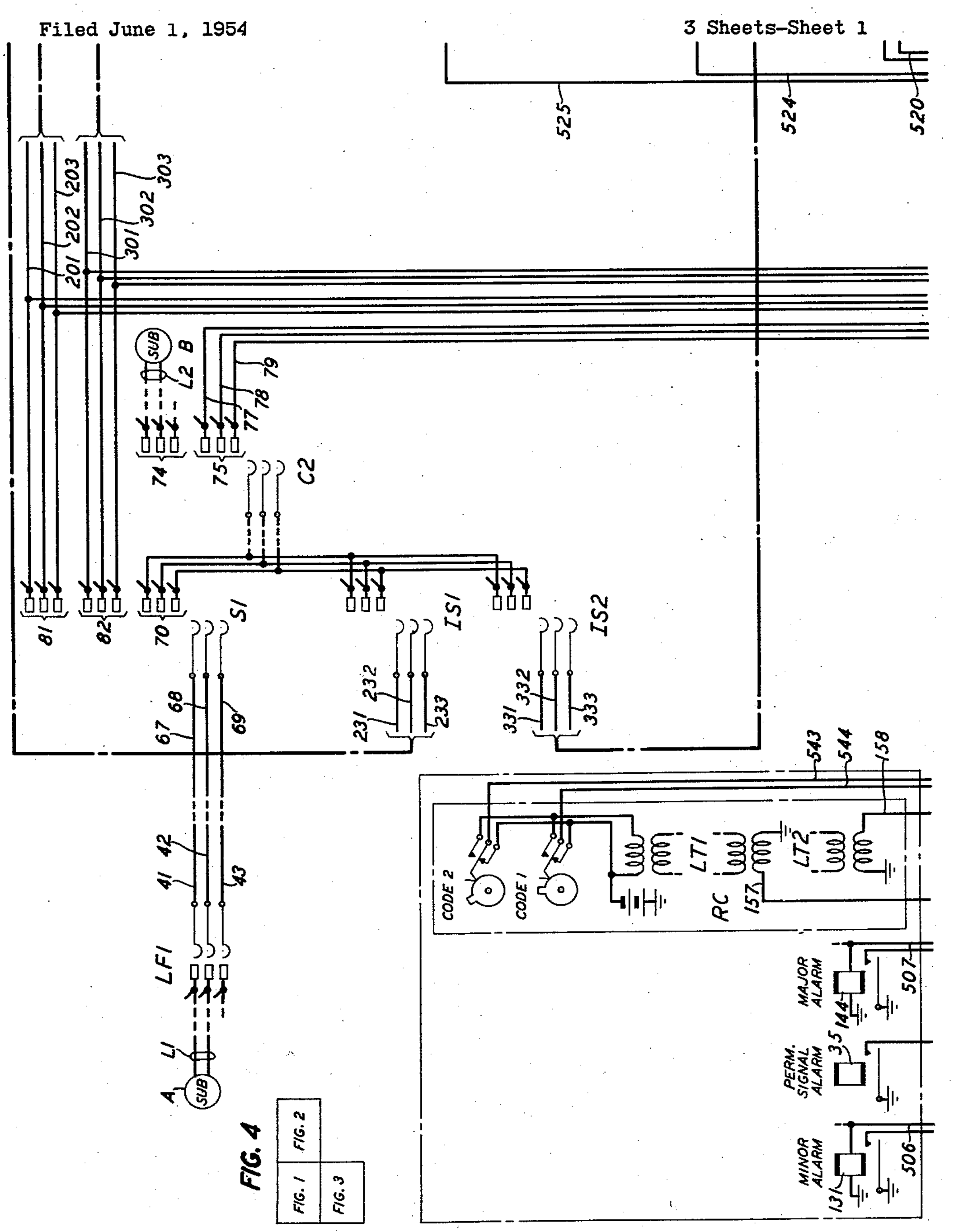
Fig. 1 shows, in schematic form, a subscriber's station and certain of the switching equipment at the unattended office together with a part of the alarm apparatus at that office.
Fig. 4 shows the manner in which Figs. 1 to 3 should be arranged.
Figure 2:
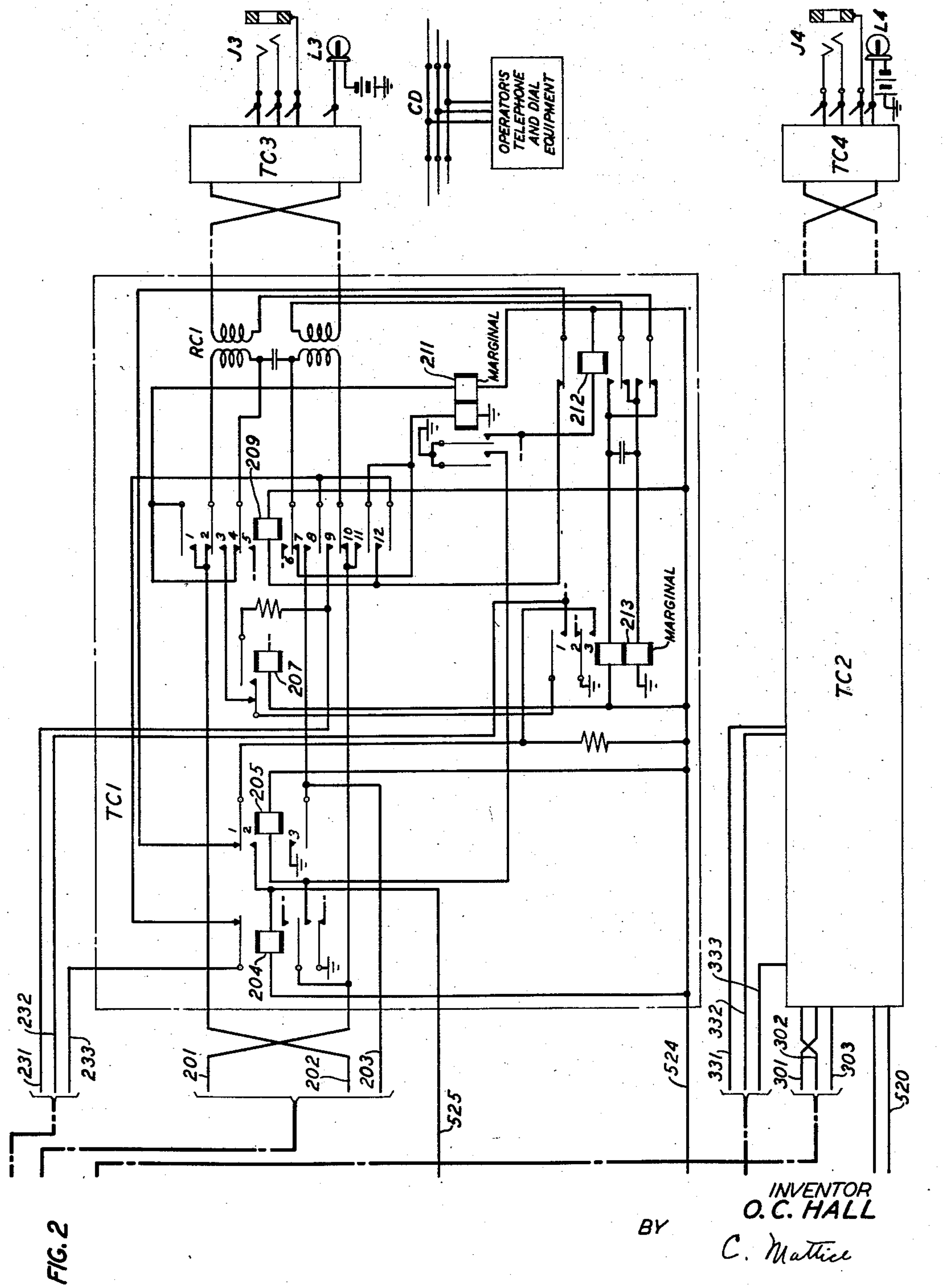
Fig. 2 shows two of the two-way trunk circuits connecting the unattended office with the operator office, some of the details of one trunk being shown.

As previously mentioned the present invention is an improvement on the system disclosed in the above-identified Walters patent and reference is hereby made to the disclosure of that patent for a showing of the circuit details omitted from the present drawing. For convenience in referring to the Walters patent, corresponding elements of Figs 1 to 3 have been given the same reference characters as employed in that patent, added circuit elements being identified by numbers starting with the number 500.

Briefly, the unattended office includes subscribers' substations, such as substations A and B, connected over lines L1 and L2 to terminals in the banks of a plurality of line finders including line finder LF1 and to terminals in the banks of connectors, such as connector C2. Each line finder is permanently associated with a first selector switch, such as switch S1, which in turn has access to connectors, such as connector C2 or to outgoing trunk circuits, such as two-way trunk circuits TC1 and TC2. Trunk circuits TC1 and TC2 are also connected to incoming selectors, such as selectors IS1 and IS2, which in turn have access to connectors, such as connector C2, over which connections may be completed to wanted lines. At the operator office the trunk circuits TC1 and TC2 appear in incoming trunk circuits TC3 and TC4 which terminate in jacks J3 and J4 at an operator's position which is equipped with cord circuits and position equipment indicated by the cord CD. Calls from substations at the unattended office to the operator office and from the operator office to substations at the unattended office are dsecribed in the above-identified Walters patent.

Figure 3:
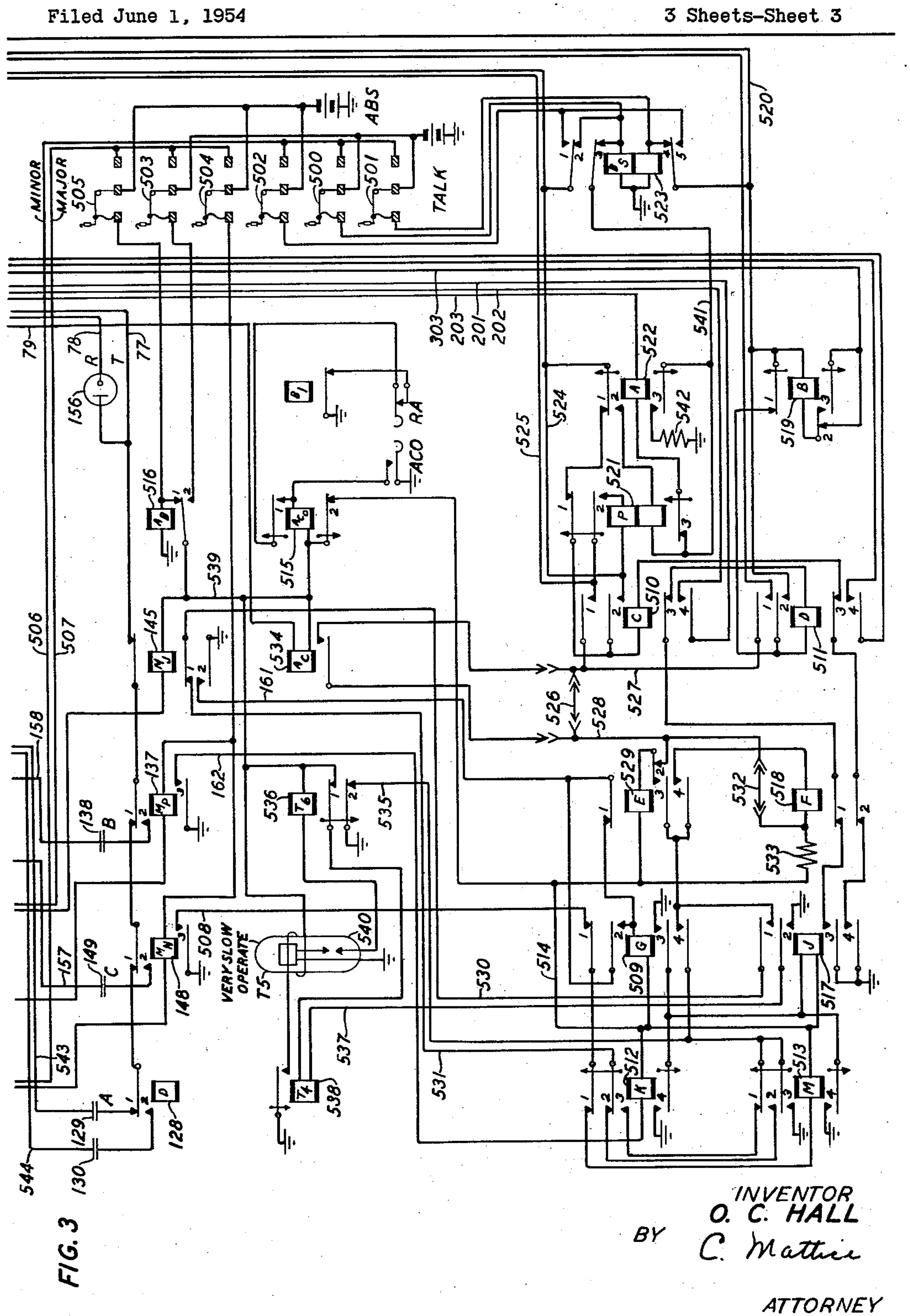
Fig. 3 shows a further part of the alarm apparatus together with the alarm sending circuit at the unattended office.

In the manner described in the aforementioned Walters patent, minor trouble conditions, such as the opening of a fuse which controls a single piece of equipment, operate minor alarm relay 131, in turn operating relay 148, while major trouble conditions, such as the opening of a fuse which controls a large number of pieces of equipment, operate major alarm relay 144 in turn operating relay 145. In addition, if a large number of permanent signal conditions occur the permanent signal alarm relay 35 is operated, in turn operating relay 137. Typical major and minor fuse arrangements are shown at the right of Fig. 3 where fuses 500 and 501 are included individually in the circuits of relays 510 and 511. If either of these fuses opens, battery is connected over conductor 506 to the winding of minor alarm relay 131 to originate a minor alarm. Fuse 504 on the other hand is included in the circuit of the alarm relays 148 and 137. If this fuse opens it connects battery over conductor 507 to the winding of the major alarm relay 144.

When minor alarm relay 148 is operated, it closes a circuit from ground over its contact 3, conductor 508, contact 1 of relay 509, contact 1 of relay 512, winding of relay 513, conductor 514, contact 2 of relay 515, conductor 539, contact 1 of normally operated relay 516 to battery over fuse 505. Relay 513 operates in this circuit and closes a circuit from ground over its contact 4 through the winding of relay 517 to battery over conductor 514 as above traced. Relay 517 operates to initiate the transmission of the alarm signal to the operator office.

The alarm sending circuit of Fig. 3 has access to the two interoffice trunk circuits TC1 and TC2. If trunk circuit TC1 is in use, ground is connected to the sleeve conductor 203 under the control of relay 205 on an outgoing call and under the control of relay 209 on an incoming call. Similarly, sleeve conductor 303 of trunk circuit TC2 is marked with ground when that trunk circuit is busy.

With relay 517 operated, two circuits are prepared for seizing one of the trunk circuits TC1 and TC2. These circuits may be traced from ground over contact 3 of relay 517, contact 1 of relay 518, contact 3 of relay 510, winding of relay 511, contact 1 of relay 519, conductor 520, contact 4 of normally operated relay 523 to battery over fuse 501 and from ground over contact 4 of relay 517, contact 2 of relay 518, contact 3 of relay 511, winding of relay 510, contact 1 of relay 521, contact 1 of relay 522, conductor 524, contact 2 of relay 523 to battery over fuse 500.

When sleeve conductor 203 is grounded, a circuit is completed from that ground through the winding of relay 522, contact 3 of relay 521, contact 3 of relay 523 to battery over fuse 500 and relay 522 operates, opening the circuit of relay 510. Similarly, when sleeve conductor 303 is grounded, relay 519 is operated opening the circuit of relay 511. If both trunks are idle either relay 510 or 511 may operate, and the first relay to operate locks and opens the circuit of the other relay. For example, assuming that relay 510 operates, it will lock over its contact 2 to battery on conductor 524 and open at its contact 3 the circuit of relay 511. At its contact 4, relay 510 connects together tip conductor 201 and ring conductor 202 of trunk circuit TC1, completing a circuit from battery on conductor 524 through the right winding of relay 211, contact 4 of relay 209, upper left winding of repeating coil RC1, contact 2 of relay 209, conductor 202, contact 4 of relay 510, conductor 201, contact 10 of relay 209, lower left winding of repeating coil RC1, contact 7 of relay 209 to ground through the left winding of relay 211. Relay 211 operates in this circuit, in turn operating relay 212 which reverses the connection of battery and ground to the right windings of repeating coil RC1 to initiate the operation of the incoming trunk circuit TC3 and light lamp L3 associated with jack J3. Relay 211 also operates relay 205 to ground conductor 203 and operate relay 522.

When the operator inserts her cord in jack J3, relay 213 operates, closing a circuit from ground over its contact 3, contact 2 of relay 205, conductor 525, contact 1 of relay 510 to conductor 527. In an unattended office served by a limited number of trunks, straps 526 and 532 will be wired and the circuit above traced to conductor 527 extends over strap 526, conductor 528, contact 2 and winding of relay 529 to battery on conductor 514, operating relay 529 which locks in a circuit from battery on conductor 514, winding and contact 3 of relay 529, contact 1 of relay 517, conductor 530, contact 1 of relay 145, conductor 531, contact 2 of relay 512, contacts 2 and 3 of relay 513 to ground. Relay 529, in operating, closes a circuit from ground on its locking circuit over its contact 4 through the winding of relay 518, resistance 533 to battery on conductor 514, but relay 518 cannot operate until the operator disconnects, causing the removal of ground from conductor 528 which is connected over strap 532 to resistance 533 in shunt of the winding of relay 518. Relay 518 when operated opens the circuits of relays 510 and 511 causing the operated relay, in this case relay 510, to release and preventing the reoperation of either relay. The release of relay 510 opens the connection between conductors 201 and 202, retiring the lamp L3 associated with jack J3. Therefore, after the alarm signal has been transmitted to the operator office and has been answered, the alarm sending equipment is disabled and locked, in the case of a minor alarm as above described, under the control of the minor alarm relay until the trouble has been corrected.

If there is a sufficient supply of trunks, straps 526 and 532 will be omitted. When the operator answers the signal at jack J3 and receives no reply to her challenge, she recognizes this condition as an alarm condition and, without removing her cord from jack J3, will insert another cord in the jack of another trunk, for example jack J4 operating trunk circuits TC4 and TC2. She will dial the number assigned to the alarm checking terminal causing the incoming selector IS2 to select a connector which will be directed to the set of terminals 75 assigned to trouble checking. The incoming call causes the operation of the relay, like relay 213, in turn operating the relay, like relay 209, which disconnects the repeating coil from the terminals in the bank of selector S1 and connects it to the brushes of incoming selector IS2 and thence to conductors 77 and 78. The relay, like relay 209, also extends ground to conductor 333 and thence through incoming selector IS2 and connector C2 to conductor 79, completing a circuit through the winding of relay 534, conductor 539, contact 1 of relay 516, fuse 505 to battery. Relay 534 operates and connects conductor 527 to conductor 528 to operate relay 529. With strap 532 omitted the operation of relay 529 immediately operates relay 518 to release relay 510 and the connection across conductors 201 and 202, thereby retiring the lamp of the cord circuit associated with jack J3. The operator receives an indication over the trouble checking circuit of the nature of the call as will be described hereinafter. When the operator withdraws cord circuit CD from jack J3 trunk circuits TC3 and TC1 release. Since relay 518 is held operated under the control of relays 529 and 513 and relay 513 is held operated by the minor alarm condition, no additional minor alarms can be sent until the alarm condition has been removed.

If a major trouble condition arises, operating major alarm relay 144 and in turn relay 145 at a time when no other alarm has been sent, the operation of relay 145 closes a circuit from ground over contact 2 of relay 145, conductor 161, contact 1 of relay 529, winding of relay 509 to battery over conductor 514. If relay 529 has been operated and locked by a minor alarm, the operation of relay 145 opens the locking circuit of relay 529 causing that relay to release, in turn releasing relay 518, after which the circuit above traced for relay 509 is completed. Relay 509 operates and locks over its contact 2 to ground on conductor 161 independent of relay 529. At its contact 1, relay 509 opens the circuit of relay 513 causing that relay to release, even though a minor alarm condition may exist. At its contact 3, relay 509 closes a circuit for operating relay 517 which initiates the seizure of a trunk and the transmission of the alarm signal as previously described. When the operator at the operator office answers the alarm call, relay 529 is operated as above described, but in this case its locking circuit extends over contact 3 of relay 529, contact 4 of relay 509, conductor 535 to ground at contact 2 of relay 536.

Whenever relay 517 operates, it connects ground over its contact 2 to conductor 537 completing a circuit through the winding of relay 538, contact 1 of relay 536, conductor 539, contact 1 of relay 516, fuse 505 to battery. Relay 538 operates in this circuit and closes a circuit from ground over its contact through the winding of relay 540 to battery on conductor 539. Relay 540 is an especially designed relay which is very slow to operate, so that an interval of twenty to thirty minutes elapses between the completion of its energizing circuit and the closure of its contact. It will of course be understood that another type of timing mechanism may be used if desired. When, at the end of this interval, relay 540 closes its contact, it completes a circuit from ground over its contact through the winding of relay 536 to battery on conductor 539. Relay 536 operates, opening the circuit of relay 538. Relay 538 releases slowly, in turn releasing relay 540 which releases quickly to open the circuit of relay 536 which also releases slowly.

At its contact 2, relay 536 opens the locking circuit of relay 529 which now releases, in turn releasing relay 518. Relays 509 and 517 are held operated under the control of the major alarm relay 145 and therefore the release of relay 518 causes a second alarm signal to be transmitted. As soon as relay 536 releases, ground is again connected to conductor 535 to prepare the locking circuit for relay 529. The operating circuit for relay 538 is also reclosed by the release of relay 536 to initiate the measurement of another twenty to thirty-minute interval. Therefore, in the case of a major alarm, a new alarm signal is transmitted every twenty to thirty minutes until the trouble is corrected. It may be noted that the operation of relays 538, 540 and 546 also takes place in response to a minor alarm, but, since relay 529 is locked to ground over the contact of relay 513, independent of relay 536, these timing relays are without effect in connection with a minor alarm.

When, as described in the above-identified Walters patent, more than a predetermined number of lines develop a permanent signal condition, relays 35 and 137 are operated. When relay 137 operates, it closes a circuit from ground over its contact 3, conductor 162, winding of relay 512 to battery on conductor 514. Relay 512 operates, closing a circuit from ground over its contact 4 through the winding of relay 517 to battery on conductor 514, causing relay 517 to operate. It also opens at its contact 1 the circuit of relay 513 causing that relay to release if operated. In addition, relay 512 at its contact 2 opens the locking circuit of relay 529 causing the latter relay to release if it had been previously operated as a result of a minor alarm. The release of relay 529 also releases relay 518. With relay 518 released and relay 517 operated, a new alarm is sent to the operator office. As above, when the operator at the operator office answers the alarm call, relay 529 is operated locking in this case over its contact 3, contact 1 of relay 517, conductor 530, contact 1 of relay 145, conductor 531, contact 3 of relay 512, contact 1 of relay 513, conductor 535 to ground at contact 2 of relay 536. Relay 517 initiates the operation of the timing relays 538, 540 and 536 and, since relay 529 is now locked under the control of relay 536 a new alarm signal will be transmitted at twenty to thirty-minute intervals.

Since the circuit of relay 513 is open whenever a major alarm or a multiple permanent signal alarm has been sent, a minor alarm following an alarm of greater magnitude is not effective until after the more important trouble is cleared.

The trunk circuits used for transmitting alarms normally receive battery over front contacts of relay 523 and the main talking battery. If the main talking battery fails, relay 523 releases, transferring conductors 524 and 520 to the alarm battery supply. As previously described, relay 522 is operated whenever trunk circuit TC1 is in use. Battery over fuse 500, contact 3 of relay 523 and conductor 541 is normally connected to one side of the lower winding of relay 521 in parallel with the winding of relay 522. With relay 522 operated, battery on conductor 524 is connected over contact 2 of relay 522 to the other side of the lower winding of relay 521 and ground through resistance 542 is connected to conductor 541. The current flow through the lower winding of relay 521 under this condition is not sufficient to operate that relay. If, however, the talking battery supply fails and relay 523 releases, battery is disconnected from conductor 541 and, with relay 522 operated, relay 521 operates in a circuit from ground through resistance 542, contact 3 of relay 522, conductor 541, lower winding of relay 521, contact 2 of relay 522, conductor 524, contact 1 of relay 523, fuse 502 to the alarm battery supply. Relay 521 locks in a circuit from battery on conductor 524, upper winding and contact 2 of relay 521, conductor 525, contact 2 of relay 205 to ground at contact 3 of relay 213.

Relay 521 opens the circuit of relay 522 causing that relay to release and opens the operating circuit of relay 510. The failure of the main signal battery causes the trunk TC1 to transmit a disconnect signal to the operator due to the release of the cut-through relays of the associated selector, for example selector S1. When the operator disconnects, ground is removed from conductor 525 and relay 521 releases slowly to allow time for the trunk circuit to restore.

If a main talking battery fuse opens, major alarm relay 144 operates from the alarm battery supply as described in the above-identified Walters patent, in turn operating relay 145 which also receives battery from the alarm battery supply. If trunk circuit TC2 is idle, as soon as relay 523 releases, relay 511 operates and transmits an alarm signal over trunk TC2. If both trunk circuits TC1 and TC2 are busy, the release of relay 523 supplies battery from the alarm battery supply to conductors 520 and 524 holding relay 519 operated and operating relay 521 to release relay 522 as above described. As soon as trunk TC1 is released, relay 521 releases and an alarm is transmitted over trunk TC1.

Assume that the operator sets up an alarm checking connection as previously described over trunk circuit TC1, incoming selector IS1 and connector C2. The connector C2 supplies ringing current to the tip and ring conductors 77 and 78 across which gas-filled tube 156 is bridged. Tube 156 responds to ringing current imposed thereon and effects the operation of the ringing trip relay (not shown) in the connector to cause the disconnection of the ringing current source and the closing of the talking connection in the usual manner, after which tube 156 is deenergized.

As soon as the talking circuit is established the tip conductor 77 is extended to a trouble tone transmitting circuit, the particular tone being dependent on the character of the trouble. In the case of a major alarm, relay 145 is operated and the tone circuit is open, so that the absence of tone indicates the major alarm condition. If relay 137 is operated because of an excessive permanent signal condition, conductor 77 is extended over the back contact of relay 145, contact 2 of relay 137 through condenser 138, conductor 158 to the secondary winding of repeating coil LT2, the primary of which is connected to a characteristic tone source. In the case of a minor alarm, relay 148 is operated and conductor 77 is extended over the back contact of relay 145, contact 1 of relay 137, contact 2 of relay 148, condenser 149, conductor 157 to the secondary winding of repeating coil LT1, the primary of which is connected to a different characteristic tone source.

The operator may also set up such an alarm checking connection as a matter of routine and, if no troubles exist, conductor 77 will be extended over the back contact of relay 145, contact 1 of relay 137, contact 1 of relay 148, contact 1 of relay 128, condenser 129, conductor 543 to the code 2 ringing conductor. Relay 128 is operated if a permanent signal condition on one or more lines continues for a predetermined length of time. With relay 128 operated, conductor 77 is extended as above traced to the armature of relay 128 and over the front contact of that relay through condenser 130 and over conductor 544 to the code 1 ringing conductor. It is therefore apparent that the tone applied to the alarm checking terminal is indicative of the trouble condition existing at the unattended station.

What is claimed is:

1. In a telephone system, an unattended office, an operator office, trunks for use on calls from said unattended office to said operator office, means in said unattended office to indicate a minor trouble condition, other means in said unattended office to indicate a major trouble condition, means under the control of either of said trouble indicating means for seizing an idle one of said trunks to initiate an alarm call, means operated over the seized trunk responsive to the answer of the call and the subsequent release of the connection by the answering operator in the operator office for releasing the trunk in the unattended office, and means under the control of said major trouble indicating means for repeatedly initiating an alarm call.

2. In a telephone system, an unattended office, an operator office, trunks for use on calls from said unattended office to said operator office, means in said unattended office to indicate a minor trouble condition, other means in said unattended office to indicate a major trouble condition, means under the control of either of said trouble indicating means for seizing an idle one of said trunks to initiate an alarm call, means operated over the seized trunk responsive to the answer of the call and the subsequent release of the connection by the answering operator in the operator office for releasing the trunk in the unattended office, and means under the control of said major trouble indicating means for further initiating alarm calls erator office, trunks for use on calls from said unattended at predetermined intervals.

3. In a telephone system, an unattended office, an op- office to said operator office, means in said unattended office to indicate a minor trouble condition, other means in said unattended office to indicate a major trouble condition, means under the control of either of said trouble indicating means for seizing an idle one of said trunks to initiate an alarm call, means operated over the seized trunk responsive to the answer of the call and the subsequent release of the connection by the answering operator in the operator office for releasing the trunk in the unattended office, means under the control of said major trouble indicating means for further initiating alarm calls at predetermined intervals, and means responsive to the removal of said major trouble condition for releasing said major trouble indicating means to terminate the repeated initiation of alarm calls.

4. In a telephone system an unattended office, an operator office, trunks for use on calls from said unattended office to said operator office, means in said unattended office to indicate a minor trouble condition, other means in said unattended office to indicate a major trouble condition, means under the control of either of said trouble indicating means for seizing an idle one of said trunks to initiate an alarm call, means operated over the seized trunk responsive to the answer of the call and the subsequent release of the connection by the answering operator in the operator office for releasing the trunk in the unattended office, means for locking said releasing means under the control of the operated one of said trouble indicating means, and means effective when said releasing means is locked under the control of said major trouble indicating means for unlocking said releasing means at the end of a predetermined interval to cause the reoperation of said seizing means.

References Cited in the file of this patent

UNITED STATES PATENTS

| | | |
|---|---|---|
| 1,974,087 | Stocker | Sept. 18, 1934 |
| 2,262,595 | Walters | Nov. 1, 1941 |
| 2,278,172 | Dimond | Mar. 31, 1942 |
| 2,580,757 | Germanton | Jan. 1, 1952 |
| 2,734,947 | Frankel | Feb. 14, 1956 |